(12) United States Patent
Kirkpatrick

(10) Patent No.: US 7,277,734 B1
(45) Date of Patent: *Oct. 2, 2007

(54) DEVICE, SYSTEM AND METHOD FOR AUGMENTING CELLULAR TELEPHONE AUDIO SIGNALS

(75) Inventor: Mark Kirkpatrick, Conyers, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 833 days.

This patent is subject to a terminal disclaimer.

(21) Appl. No.: 09/964,389

(22) Filed: Sep. 28, 2001

(51) Int. Cl.
H04B 1/38 (2006.01)

(52) U.S. Cl. ............... 455/567; 455/472; 455/401; 455/575.1; 455/90.3

(58) Field of Classification Search ............ 455/90.01, 455/90.03, 572, 573, 575.1, 401, 566.1, 556.2, 455/557, 558, 559, 567; 379/373.01, 373.03, 379/373.04, 374.01, 374.02, 90.1, 90.3, 572, 379/573, 575.1, 401, 566.1, 566.2, 557, 558, 379/559, 567; 340/636.1, 636.16, 7.2, 7.32
See application file for complete search history.

(56) References Cited

U.S. PATENT DOCUMENTS

| | | | |
|---|---|---|---|
| 5,251,329 A | 10/1993 | Takagi et al. | |
| 5,452,354 A | 9/1995 | Krynolahti et al. | |
| 5,767,778 A * | 6/1998 | Stone et al. | ............ 340/636.1 |
| 6,094,587 A | 7/2000 | Armanto et al. | |
| 6,244,894 B1 | 6/2001 | Miyashita | |
| 6,298,245 B1 | 10/2001 | Usui et al. | |
| 6,501,967 B1 | 12/2002 | Makela et al. | |
| 6,556,665 B1 * | 4/2003 | Suzuki et al. | ............. 379/88.1 |
| 6,597,279 B1 * | 7/2003 | Haraguchi | ................ 340/7.2 |
| 6,600,098 B2 | 7/2003 | Mizuno et al. | |
| 6,810,274 B2 * | 10/2004 | Sawada et al. | ............ 455/572 |
| 2001/0014616 A1 | 8/2001 | Matsuda | |
| 2001/0016483 A1 | 8/2001 | Nakajima | |
| 2001/0041590 A1 | 11/2001 | Silbufenig | |
| 2001/0044331 A1 | 11/2001 | Miyoshi | |
| 2002/0019250 A1 | 2/2002 | Le-Faucher | |
| 2002/0111189 A1 | 8/2002 | Chou | |
| 2002/0160751 A1 | 10/2002 | Yingju | |
| 2002/0186122 A1 | 12/2002 | Gehlot | |
| 2003/0008646 A1 | 1/2003 | Shanahan | |
| 2003/0032415 A1 | 2/2003 | Cho | |
| 2003/0176206 A1 | 9/2003 | Taniguchi | |

* cited by examiner

*Primary Examiner*—Melur Ramakrishnaiah
(74) *Attorney, Agent, or Firm*—Withers & Keys, LLC

(57) ABSTRACT

A device, system and method is described for augmenting cellular telephone signals for a cellular telephone. In an exemplary embodiment, an audio signal device cellular is provided with a sound generating device that stores one or more audio signals that are activated upon receipt of a telephone call. Optionally, the audio signal device may store a library of audio signals that may be programmable and edited. The device, system and method of the present invention enables a user to choose audio alert sounds beyond the scope of those provided by the manufacturer of a cellular telephone.

25 Claims, 4 Drawing Sheets

DEVICE, SYSTEM AND METHOD FOR AUGMENTING CELLULAR TELEPHONE AUDIO SIGNALS

BACKGROUND

1. Field of the Invention

The present invention relates generally to accessory technology used with cellular telephones. More specifically, the present invention is directed to a device, system and method for augmenting cellular telephone audio signals through a programmable accessory device.

2. Background of the Invention

Cellular telephones, also commonly known as mobile telephones, have become increasingly utilized throughout the world. Typical signals used to alert a user of a cellular telephone of an incoming telephone call include audio signals such as ringing, visual signals such as flashes or written messages, or touch signals such as vibration of the telephone. A combination of signals also is possible, such as, for example, a combination of audio and visual signals.

When a cellular telephone provides audio signals, the user typically has a limited number of pre-selected audio signal selections (which may include standard rings, musical tones, or melodies) already programmed into the telephone. Many conventional telephones do not have the ability to introduce additional audio alert signals. Thus, the user is confined to a limited group of audio alert signals that a manufacturer has pre-programmed into the telephone. Although some telephone systems allow a user to download additional audio alert signals into the telephone, such additional signals typically are provided only by the manufacturer, and are merely an expansion of the original limited inventory of audio signals available to a user. Thus, the user is still confined to a set of audio signals that a manufacturer provides to its users. The user does not have the ability to use audio signals of her own choice, such as, for example, a favorite song or melody, sounds of nature, or voice sounds of a child or a pet or the user herself.

Thus, there is a need for an economical but flexible accessory device, system, and method that enables a user to easily choose any type of audio sounds to be used by a cellular telephone and allow such audio sounds to be designated as the incoming telephone call audio alert signal.

SUMMARY OF THE INVENTION

The present invention overcomes the drawbacks of conventional cellular telephone audio alert signals by providing a device, system and method that enables the user to enter audio signals of his or her own choice to use as audio alert signals for the telephone.

As used throughout this disclosure, the term "augmenting", when used in reference with cellular telephone audio signals, refers to an increase in choices that a user has for audio alert signals. Thus, an increase in choices of alert signals beyond that provided by a manufacturer is an augmenting of cellular telephone audio signals.

As used throughout this disclosure, the term "sound generating device" is any assembly that is capable of storing sound files, retrieving sound files, and playing sound files. Thus, such a device typically is piezoelectric and contains software to enable a stored sound file to be played, necessary EPROM, ROM and/or RAM memories, and a small speaker. Such sound generating devices typically are used in toys and musical cards. This sound generating device 110 will be explained in use below.

In accordance with an exemplary embodiment, the present invention provides an audio signal device that plays sounds and is used with a cellular telephone. The audio signal device has electrical terminals, located on a shell, that are connectable with electric terminals on a cellular telephone. The audio signal device optionally also has electric terminals that are connectable with electric terminals on a cellular telephone battery. The audio signal device also has a sound generating device capable of storing a sound file. The sound generating device is triggered to play sound when an incoming telephone call is received. Thus, the audio signal device is attachable to an existing cellular telephone body without need for modification to the telephone body or the cellular telephone battery. Optionally, the sound generating device can store multiple sound files, and a selector switch on the shell that allows a user to select a designated sound file from the multiple sound files. Furthermore, an optional external connector socket allows a user to edit, add or delete sound files stored in the sound generating device.

In accordance with another exemplary embodiment, the present invention provides a cellular telephone system that includes a cellular telephone body, a cellular telephone battery, and an audio signal device as described above.

In accordance with yet another exemplary embodiment, the present invention provides a method of programming designated audio alert signals on a cellular telephone by adding or deleting sound files to the audio signal device as described above.

In accordance with another exemplary embodiment, the present invention provides a method of selecting a designated audio alert signal on a cellular telephone using the selector switch as described above to scroll through a selection of audio files on the audio signal device, hearing the selections, and choosing one to be the designated alert signal for incoming telephone calls.

In accordance with an exemplary embodiment, the present invention includes a device, system and method for selectively programming a telephone with any type of sound signal to be used as an audio alert signal for incoming calls.

In another exemplary embodiment of the present invention, the present invention includes a device, system and method that is compatible with different types of cellular telephone systems.

It is therefore an object of the present invention to provide a device, system, and method of augmenting cellular telephone audio alert signals that do not require changing the design of the telephone body itself.

It is yet another object of the present invention to provide a device for augmenting cellular telephone audio alert signals that is designed to fit between the telephone body and the battery.

These and other objects of the present invention will become apparent upon a reading of the following detailed description in conjunction with the associated drawings.

It is to be understood that both the foregoing general description and the following detailed description are exemplary and explanatory only and are not restrictive of the invention, as claimed.

The advantages and purpose of the invention will be set forth in part in the description that follows, and in part will be obvious from the description, or may be learned by practice of the invention. The advantages and purpose of the invention will be realized and attained by means of the elements and combinations particularly pointed out in the appended claims.

DETAILED DESCRIPTION OF THE INVENTION

Figure 1:
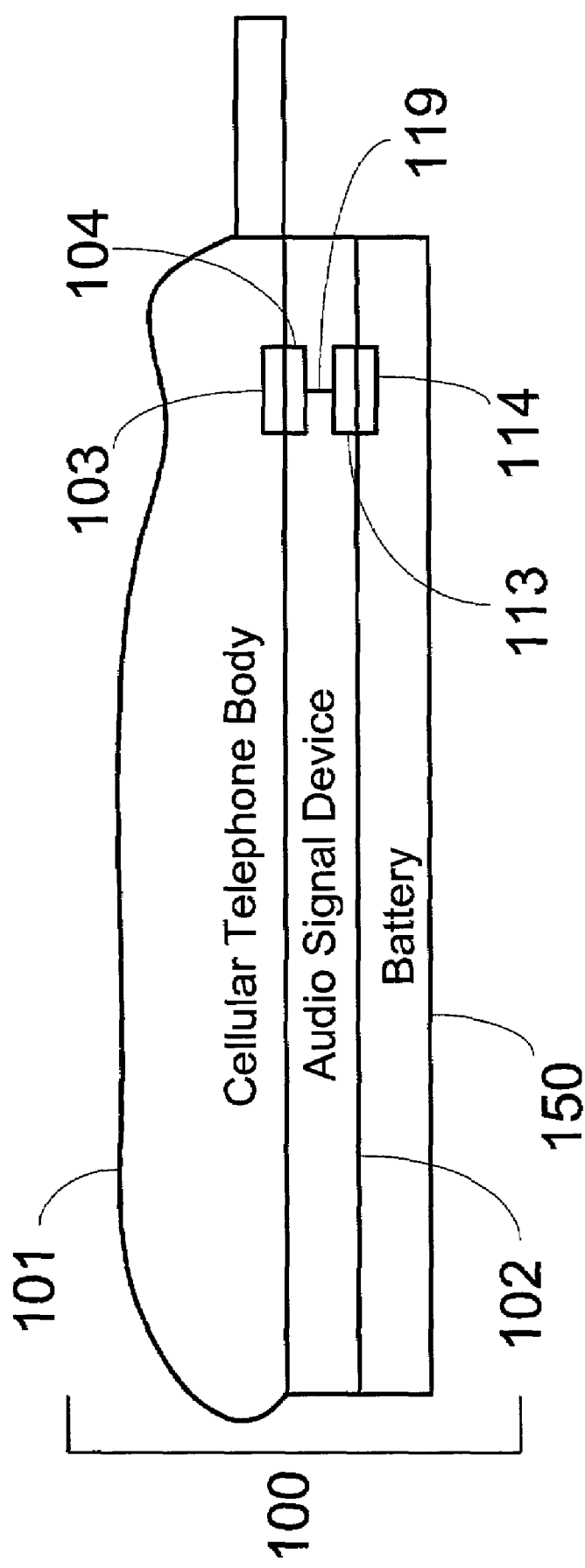
FIG. 1 illustrated an exemplary embodiment of the present invention in position between a cellular telephone body and a cellular telephone battery.

An exemplary embodiment of a device according to the present invention is shown in FIG. 1. A cellular telephone system 100 using the exemplary embodiment of the audio signal device 102 is shown. A cellular telephone 101 is positioned to one side of the audio signal device 102 and a conventional cellular telephone battery 150 is positioned on the opposite side of audio signal device 102. Electrical connectors 103, 104, 113, and 114 connect the three components of the system 100 together. Electrical connectors 103 on the cellular telephone body 101 electrically communicate with electrical connectors 104 on the audio signal device 102. Electrical connectors 114 on the audio signal device electrically communicate with electrical connectors 114 on the battery 150.

Suitable physical connection means (not shown) are used to reversibly lock the cellular telephone body 101 to the audio signal device 102, and the audio signal device 102 to the battery 150. Such connection means include those that are commonly used to reversibly lock a cellular telephone body 101 to a standard cellular battery 150.

Furthermore, in the embodiment shown in this FIG. 1, device 102 is sandwiched between the cellular telephone body 101 and the battery 150. However, the audio signal device 102 also may be positioned elsewhere, such as, for example, on the outside end of a battery 150 such that the battery is sandwiched between the cellular telephone body 101 and the audio signal device 102. In such an embodiment, the battery 102 must be designed to be able to electrically and physically connectable to both the cellular telephone body 101 and the audio signal device 102.

Figure 2:
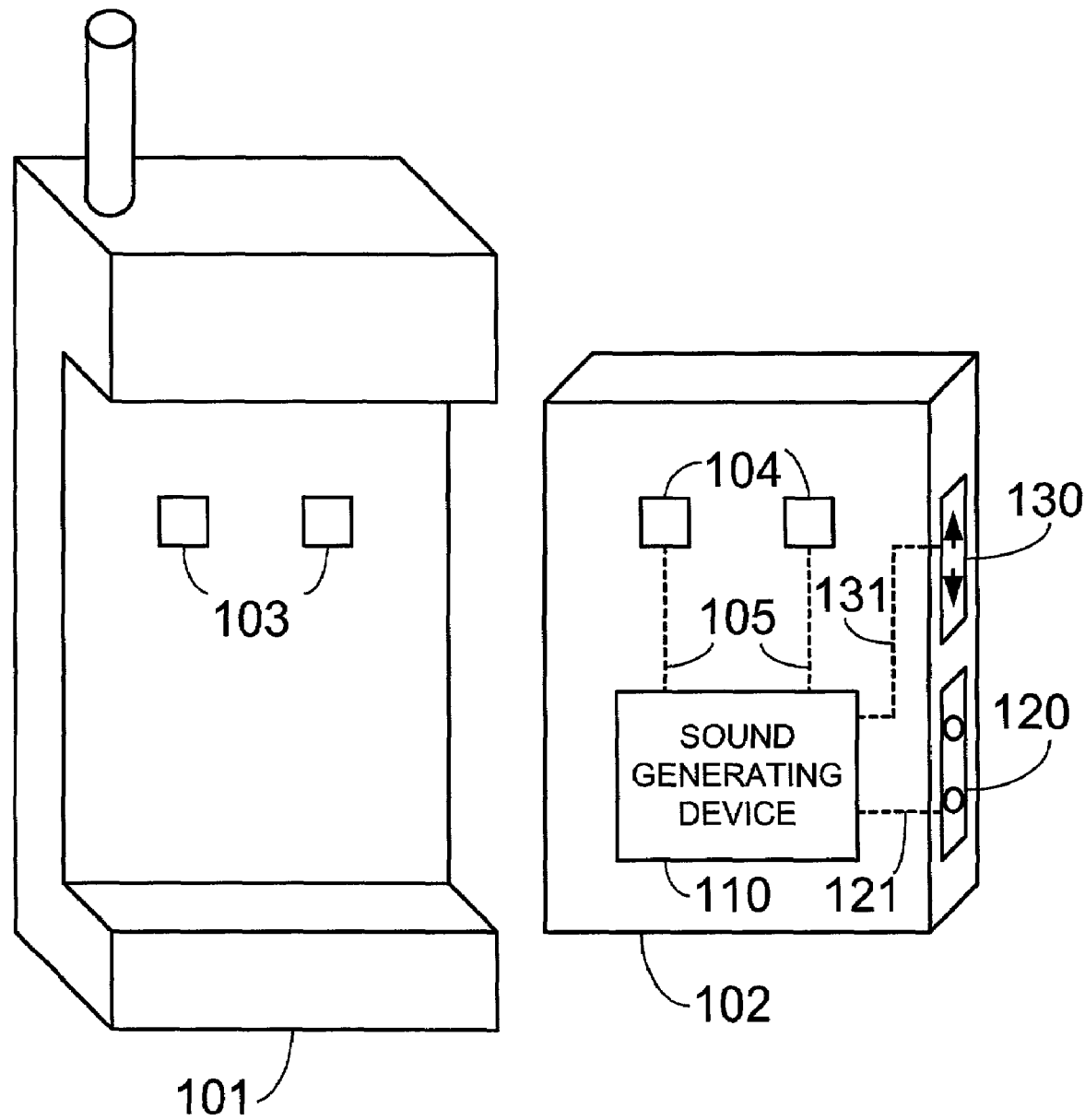
FIG. 2 illustrates a conventional cellular telephone body with a device, according to an exemplary embodiment of the present invention, that allows for a variety of audio alert signals to be used.

FIG. 2 illustrates a standard telephone body 101 in relation to a device 102 according to an exemplary embodiment of the present invention. The device 102 is in the form of a substantially rectangular planar shell that produces sound, thereby making such a device, system and method of augmenting telephone audio signals both economical and flexible.

Figure 3:
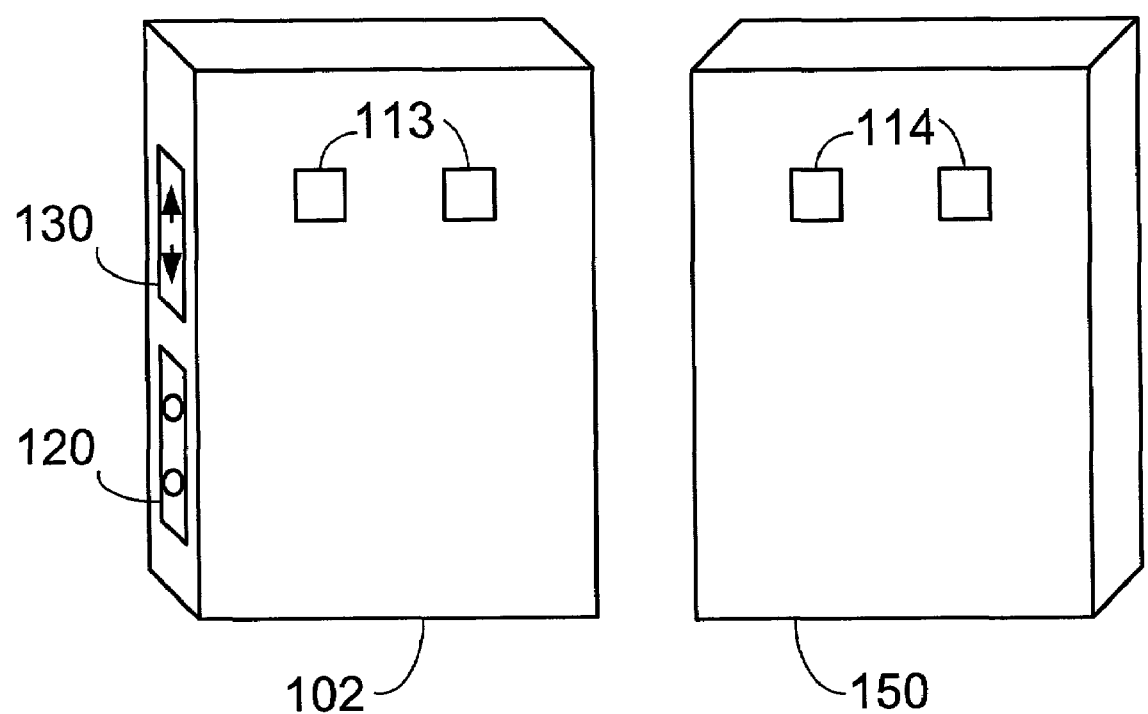
FIG. 3 illustrates an exemplary embodiment of the invention in conjunction with a cellular telephone battery.

The exemplary embodiment of the present invention shown in FIGS. 2-3 presents an improvement based on the technology of vibrating batteries, wherein an activation signal is directed to the vibrating battery to vibrate the telephone when an incoming call is received. Thus, the audio signal device 102 according to the embodiment shown in FIGS. 2-3 also depends upon an incoming signal from the body of the telephone 101 to alert the battery 150 of an incoming call. The telephone body 101 does not have to be modified to accommodate the new audio signal device 102. Furthermore, the battery 150 does not need to be modified to attach to the audio signal device 102.

Thus, the telephone body 101 is merely set up as if the battery 150 is a vibrating battery, thereby enabling the telephone body 101 to send a signal to the battery 150 through the audio signal device 102 when an incoming telephone call is received. Such a signal is needed by the battery 150 in order to activate a recorded sound signal in the audio signal device 102.

The telephone body 101 is in electrical communication with the audio signal device 102 through suitable terminal connectors 103 and 104, respectively. Thus, when an incoming telephone call signal is detected by the cellular telephone system 1100, the telephone body 101 sends a signal to the battery 150 through the audio signal device 102. When the audio signal device 102 is connected to a conventional vibration battery 150, the audio sound generating device 110 in the audio signal device 102 is signaled to activate, producing a given audio alert signal. In all aspects, the telephone body 101 is conventional and only needs to be able to notify the audio signal device 102 that an incoming telephone signal has been received. Furthermore, the designated audio alert signal also may be used for other notification alarms that are available on the cellular telephone, such as appointment alarms and the like.

Sound generating device 110 may comprise, for example, a piezoelectric device for converting electronic signals to sound waves. Alternatively, it may also comprise a miniature speaker or other transducer for converting electronic signals to sound waves. The sound generating device also has a memory in which the sound files can be stored. A sound chip that has all the components necessary to store, access, play, and generate sound from sound files may be used.

The audio signal device 102 has terminal connectors 104 that communicate with a sound generating device 110 through suitable electrical connectors 105. Furthermore, battery 150 provides power via terminal connectors 114 on battery 150 to terminal connectors 113 on audio signal device 102, to terminal connectors 104 via connector 119, and to terminal connectors 103 on the telephone body 101. The power storage area of the battery 150 is not shown in the Figures for sake of clarity. However, the power storage area of the battery 150 also is in communication with the terminal connectors 114 through suitable electrical connectors.

Sound generating device 110 may be pre-programmed with a set of audio signals that a user may use as the audio alert signal when an incoming telephone call is received. Thus, a user may purchase an audio signal device 102 that has a list of audio alert signals pre-programmed into it. As a non-limiting example, different audio signal devices 102 may have different themes, such as "sounds of nature", "popular songs", and "different automobile honks". When a user prefers another set of audio alert signals, she merely has to purchase another battery that provides such signals.

Optionally, an audio signal device 102 provides a user with a list of accessible audio alert signals. In that case, the user needs a means to select a particular desired audio signal. Such a selector means to select a desired audio alert signal may be, for example, a selector switch, button, mechanical selector, touch pad, or the like. In the embodiment shown in FIGS. 2-3, a selector switch 130 is shown that enables a user to select a desired audio alert signal by pressing up or down selector arrows that allow the user to scroll through an internal library of signals stored in audio signal device 102. Switch 130 shown in the exemplary embodiment functions by applying a gentle pressure on the up or down arrow to scroll the selection of internal audio signals in one direction or the other. Preferably, the user can hear the selections as the selections are being scrolled so as to have an indication of which signal the audio signal device 102 is being locked into using as the pre-selected audio alert signal.

Alternatively, to expand the selections of audio alert signals even beyond that provided by pre-packaged audio signal devices 102 having specific themes, an accessing means would be beneficial to provide a user with ability to access and edit the audio signal library of the audio signal device 102. Thus, such a means for accessing the signal library of the audio signal device 102 may be, for example, an electrical connector socket, plug, adapter, or the like. In the exemplary embodiment shown in FIG. 1, an electrical connector socket 120, which is electrically connected to the sound generating device 110 through suitable electrical connectors 121, is designed to receive a conventional two prong plug 220, such as the one shown in FIG. 4.

Although the switch 130 and the connector socket 120 are shown on a side of the audio signal device 102 for sake of accessibility and ease of operation for a user, such placement is merely exemplary. The switch 130 and socket 120 may be placed anywhere on the audio signal device 102 as long as they may be accessed by a user and are usable for their intended purposes.

Figure 4:
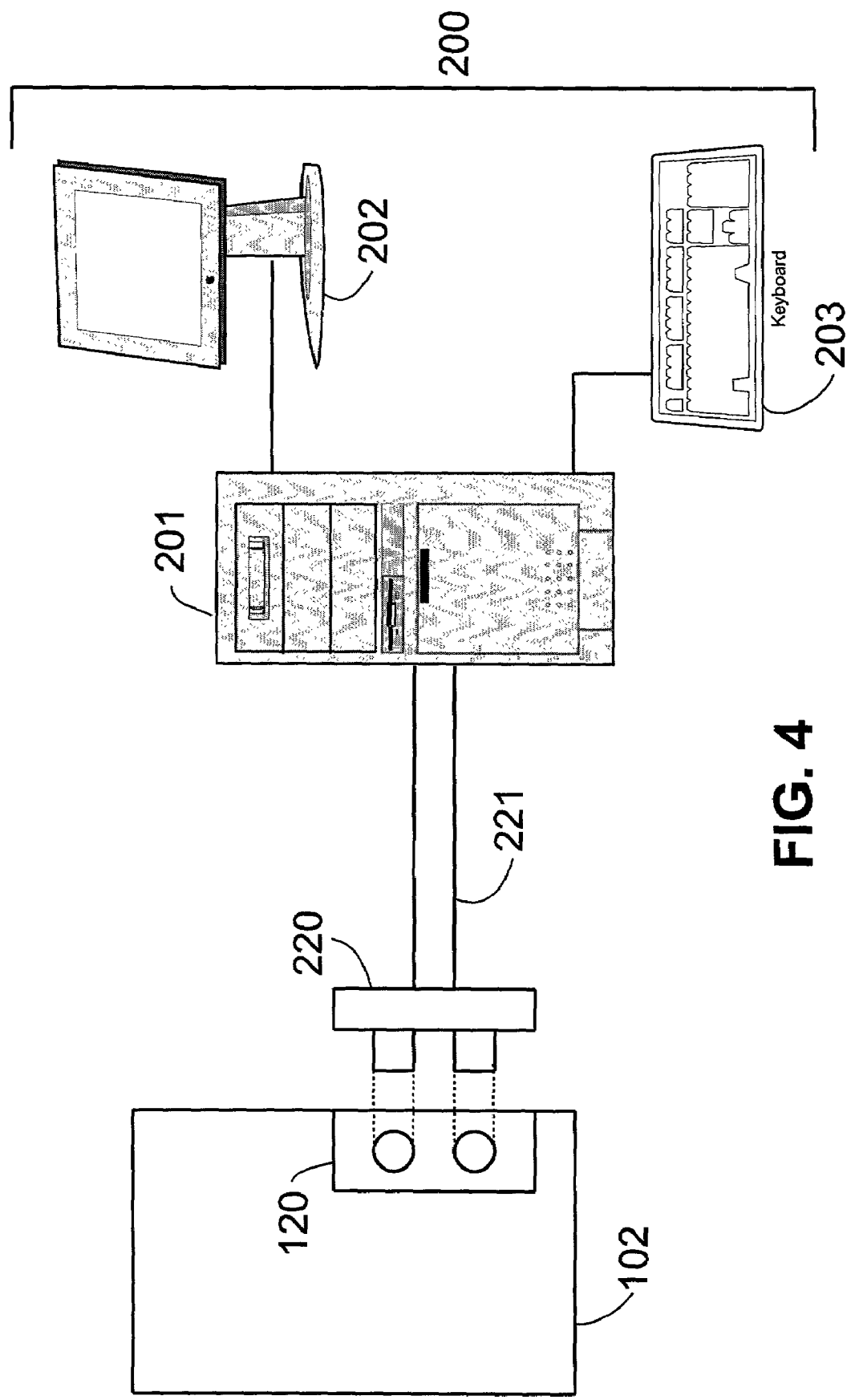
FIG. 4 illustrates an exemplary embodiment of a device, system, and method of programming audio alert signals into a device according to the exemplary embodiments shown in FIGS. 1-3.

A means for programming the audio signal selection of an audio signal device 102 is shown in the exemplary embodiment in FIG. 4 as system 200. System 200 includes a plug 220 that electrically communicates with socket 120, and allows a computer 201 to program the sound generating device 110 (not shown in FIG. 4). In this embodiment, computer 201 is provided with software that allows a user access and edit the audio alert signal library in the sound generating device 110. The computer 201 may be a desktop model with a monitor 202 and a keyboard 203, a laptop, a personal data assistant, or any other device that has the ability to electronically access a library or stored audio files in a sound generating device 110.

Through programming system 200, the user may add or delete sound files from the sound generating device 110. The sound files may be in any suitable format, such as, for example, MP3. Preferably, the user may arrange the order of sound signals in an audio signal device 102, delete any sounds signals that are no longer desired, and/or add new sound signals in a given memory slot in sound generating device 110.

Although the programming system 200 in FIG. 4 has been shown with a personal computer 201, other computers also are possible to program the alert signal library in the sound generating device 100. Such other computers include, but are not limited to, laptop computers, personal data assistants, suitable interactive paging systems, or the like. A telephone body 101 itself may be additionally programmed by its manufacturer to be able to scroll through, access, and edit alert signals in the signal library of a sound generating device 110 in an audio signal device 102.

Finally, the shape and geometry of different audio signal devices 102 would depend on the particular brand and model of cellular telephone body 101 and battery 150 that is to be connected to the device 102. Thus, consumers of such a device 102 would likely need to purchase devices 102 specifically designed for their particular brand and model of cellular telephone.

The foregoing disclosure of the preferred embodiments of the present invention has been presented for purposes of illustration and description. It is not intended to be exhaustive or to limit the invention to the precise forms disclosed.

Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device that plays alerts and is used with a wireless communication device, the device comprising:
   a substantially rectangular planar shell having electrical terminals on one side of the planar shell that are also electrically connectable to electrical terminals on a wireless communication device;
   a battery powering the wireless communication device;
   an alert generating device, located inside the shell and electrically connected to the electrical connectors of the planar shell, comprising memory for storing an alert file, wherein the alert generating device is triggered to play an alert associated with the file upon detection of a signal from the wireless communication device to the battery generated by an incoming communication by the wireless communication device and wherein further, the alert generating device is also triggered to play the alert associated with the file upon detection of a signal from the wireless communication device to the battery generated by an event at the wireless communication device other than an incoming communication; and
   a selector device on the rectangular planar shell for scrolling through a plurality of sound files and designating a sound file to use as the alert file.

2. The device of claim 1, wherein the alert generating device is a sound generating device, wherein the alert file is a sound file, wherein the alert is an audio alert, and wherein the sound generating device stores a plurality of sound files, and wherein each sound file can be designated as an audio alert signal for the telephone.

3. The device of claim 2, further comprising:
   an external connector socket on the shell in electrical communication with the sound generating device to provide external access to the plurality of sound files in the sound generating device.

4. A device for a wireless communication device that plays alerts, the device comprising:
   a shell attachable between a wireless communication device body and a wireless communication device battery;
   an alert generating device inside the shell and comprising memory for storing a plurality of alert files, wherein the alert generating device is triggered by a signal from the wireless communication device body to the battery to play an alert associated with an alert file upon detection of an incoming communication by the wireless communication device and wherein further, the alert generating device is also triggered to play the alert associated with the alert file upon detection of a signal from the wireless communication device body to the battery to play an alert associated with an alert file upon detection of an event at the wireless communication device other than an incoming communication;

an external connector socket on the shell in electrical communication with the alert generating device to provide external access for adding alert files, deleting alert files and editing alert files in the alert generating device; and a selector device on the shell for designating a file to use as an audio alert signal.

5. The system of claim 4, wherein the wireless device is a cellular telephone, the alert signal is a sound, and the incoming communication is a telephone call.

6. A device for a wireless communication device that plays alerts, the device comprising:

a shell attachable between a wireless communication device body and a wireless communication device battery;

an alert generating device inside the shell and comprising memory for storing a plurality of alert files, wherein the alert generating device is triggered by a signal from the wireless communication device body to the battery to play an alert associated with an alert file upon detection of an incoming communication by the wireless communication device and wherein further, the alert generating device is also triggered by a signal from the wireless communication device body to the battery to play the alert associated with the alert file upon detection of an event at the wireless communication device other than an incoming communication;

accessing means on the shell in electrical communication with the alert generating device for providing external access to the plurality of alert files in the alert generating device; and selecting means on the shell for designating an alert file to use as an alert signal.

7. The system of claim 6, wherein the wireless device is a cellular telephone, the alert signal is a sound, and the incoming communication is a telephone call.

8. A wireless communication device system having changeable alert signals, the system comprising:

a wireless communication device body;

a wireless communication device battery for powering the wireless communication device body;

an alert signal device, connectable with the wireless communication device body and the wireless communication device battery, including an alert generating device comprising memory for storing an alert file, wherein the alert generating device is triggered to play an alert associated with the alert file upon detection of a signal from the wireless communication device to the battery generated by an incoming communication by to the wireless communication device and wherein further, the alert generating device is also triggered by a signal from the wireless communication device body to the battery to play the alert upon detection of an event at the wireless communication device other than an incoming communication; and a selector device on the alert signal device for scrolling through a plurality of sound files and designating a sound file to use as an audio alert signal.

9. The system of claim 8, wherein the alert generating device is a sound generating device, wherein the alert file is a sound file, wherein the alert is a sound, and wherein the sound generating device stores the plurality of sound files that are capable of being added, deleted and edited.

10. The system of claim 4, further comprising:

an external connector socket on the audio signal device in electrical communication with the sound generating device to provide external access to the plurality of sound files in the sound generating device.

11. The system of claim 4, further comprising:

a computer system having an electrical plug electrically connected to the sound generating device through the connector socket, for adding deleting and editing the plurality of sound files in the sound generating device.

12. The system of claim 8, wherein the alert generating device is a sound generating device, wherein the alert file is a sound file, wherein the alert is a sound, and wherein the sound generating device stores a plurality of sound files and is triggered to play a sound associated with a designated sound file upon detection of a telephone call by the cellular telephone.

13. The system of claim 12, further comprising:

an external connector socket on the audio signal device in electrical communication with the sound generating device to provide external access to the plurality of sound files in the sound generating device.

14. The system of claim 12, further comprising:

a computer system having an electrical plug electrically connected to the sound generating device through the connector socket, for editing the plurality of sound files by adding or deleting from the sound generating device.

15. The system of claim 12, further comprising:

an external connector socket on the audio signal device in electrical communication with the sound generating device to provide external access to the plurality of sound files in the sound generating device;

a computer system having an electrical plug electrically connected to the sound generating device through the external connector socket, for modifying the plurality of sound files by adding or deleting from the sound generating device.

16. The system of claim 12, further comprising:

accessing means on the audio signal device and in electrical communication with the sound generating device for providing external access to the plurality of sound files in the sound generating device;

programming means, electrically connected to the sound generating device through the accessing means, for editing the plurality of sound files by adding and deleting sound files from the sound generating device; and selecting means on the audio signal device for designating a sound file to use as an audio alert signal.

17. The system of claim 8, wherein the wireless device is a cellular telephone, the alert signal is a sound, and the incoming communication is a telephone call.

18. A method of programming designated alert signals on a wireless communication device, the method comprising:

providing an alert signal device for use with a wireless communication device, the alert signal device including a programmable alert generating device, an external socket located on an outside surface and a selector device on the alert signal device located on the outside surface for scrolling through a plurality of alert files and designating at least a sound file to use as an alert signal;

connecting a computer system containing software that can access the alert generating device to the external socket of the alert signal device;

accessing the alert generating device;

adding or deleting an alert file via the computer onto or from the alert generating device, respectively;

playing the sound file upon detection of a signal from the wireless communication device to a battery generated by an incoming call at the wireless communication device; and playing the sound file upon detection of a signal from the wireless communication device to a battery generated by an event at the wireless communication device other than an incoming communication.

19. The method of claim 18, wherein the computer system is a personal data assistant.

20. A method of selecting a designated alert signal for a wireless communication device, the method comprising:

providing an alert signal device for use with a wireless communication device, the alert signal device including a programmable alert generating device and a selector located on an outside surface of the alert signal device, wherein the alert generating device includes a plurality of alert files;

scrolling through the plurality of alert files with the selector to experience the plurality of alert files;

experiencing exemplary alerts;

selecting a selected alert from the plurality of alert files when a designated alert file is reached;

playing the sound file upon detection of a signal from the wireless communication device to a battery generated by an incoming call at the wireless communication device; and playing the sound file upon detection of a signal from the wireless communication device to the battery generated by an event at the wireless communication device other than an incoming communication.

21. A computer readable medium containing instructions that when executed by a processor of a wireless device perform acts comprising:

storing a plurality of sound files in a memory within a body of the wireless device;

receiving input from a selector device located on an audio signal device connected to the body of the wireless device and to a battery, wherein the battery powers electronic circuitry within the body of the wireless device, the memory and a sound generating device within the audio signal device;

designating a file of the plurality to use as an alert signal by the sound generating device by manipulating the selector on the audio signal device;

generating a first electric signal from the electronic circuitry within the body of the wireless device to the battery in response to an incoming communication and also generating a second electric signal from the electronic circuitry within body of the wireless device to the battery in response to an event at the wireless device other than an incoming communication; and alerting a user with the alert signal of the designated file in response to one of the first and second electric signals generated by the electronic circuitry within the body of the wireless device.

22. A device that plays alerts and is used with a wireless communication device, the device comprising:

a planar shell having electrical terminals on one side that are electrically connectable to electrical terminals on a wireless communication device;

an alert generating device, located inside the shell and electrically connected to the electrical connectors of the planar shell, comprising memory for storing an alert file, wherein the alert generating device is triggered to play an alert associated with the alert file upon detection of a signal from the wireless communication device to a battery powering the wireless communication device upon receiving an incoming communication by the wireless communication device and to also play the alert upon detection of a signal from the wireless communication device to the battery upon detecting an event at the wireless communication device other than an incoming communication, and wherein the alert generating device further comprises a memory receiving slot for adding new alert signals from a second memory positioned within the memory receiving slot; and a selector device on the outside surface of the shell for scrolling through the plurality of sound files and designating a sound file to use as an audio alert signal.

23. The device of claim 22, wherein the wireless device is a cellular telephone, the alert signal is a sound, and the incoming communication is a telephone call.

24. A method of providing an alert with a wireless communication device that includes a body, a battery, and a planar shell that includes a selector device on the outside surface of the shell for scrolling through a plurality of alert files and designating an alert file to use as an alert signal and an alert generating device with a first memory and a memory receiving slot that receives a second memory, comprising:

storing a plurality of alert files in the first memory;

receiving the second memory into the memory receiving slot, the second memory storing a plurality of alert files different than those of the first memory;

receiving input from the selector device;

designating a file of the plurality of alert files of the first and second memory to use as an alert signal; and alerting a user with the alert signal of the designated file in response to a signal from the body of the wireless communication device to the battery upon detecting an incoming communication and alerting the user with the alert signal of the designated file in response to a signal from the body of the wireless communication device to the battery upon detecting an event at the wireless communication device other than an incoming communication.

25. The method of claim 24, wherein the wireless device is a cellular telephone, the alert signal is a sound, and the incoming communication is a telephone call.

* * * * *